No. 835,175. PATENTED NOV. 6, 1906.
A. L. BEMIS.
MOLD FOR ORNAMENTAL ARTIFICIAL STONE.
APPLICATION FILED SEPT. 30, 1905.

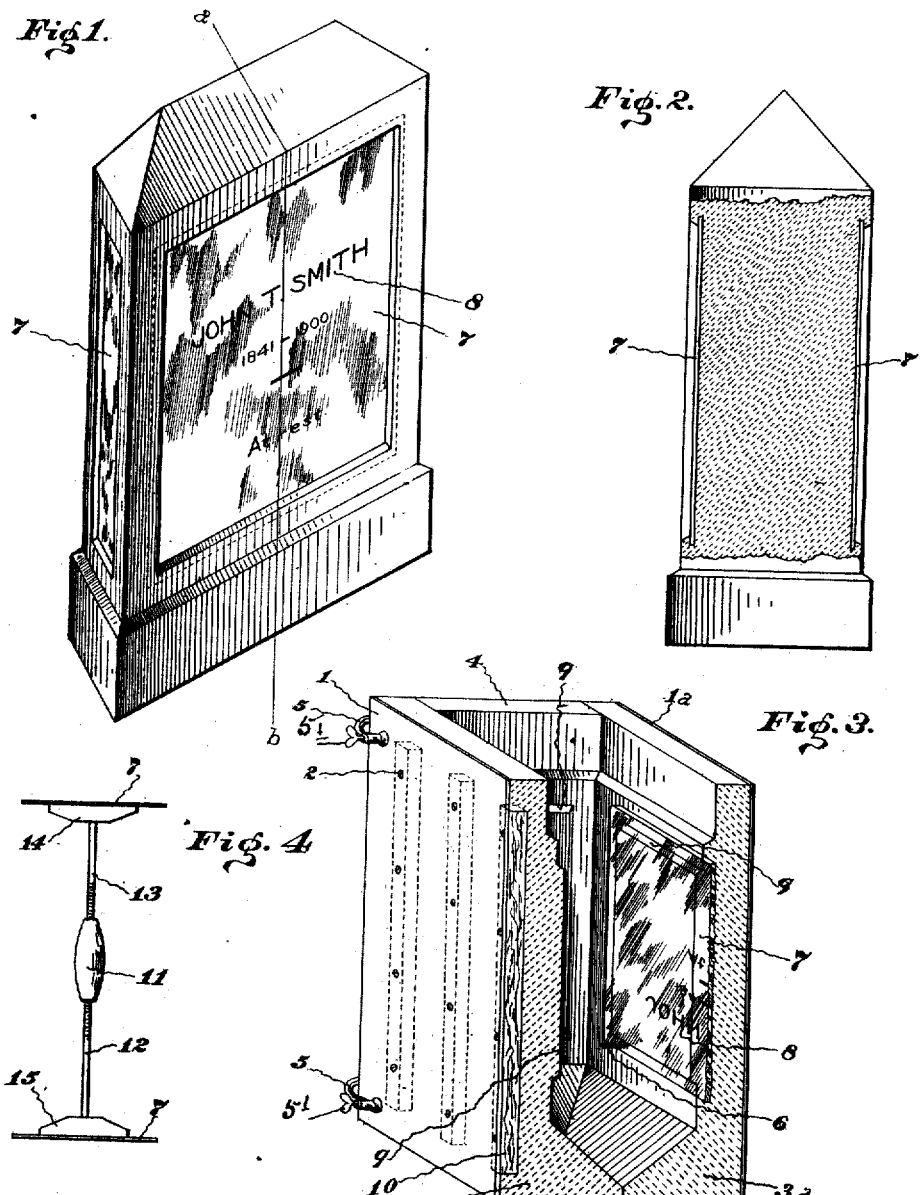

Witnesses.
Wm. Peach
G. L. Knight

Inventor.
Isabel L. Bemis
By J. Juntt
Attorney.

UNITED STATES PATENT OFFICE.

ASAHEL L. BEMIS, OF PUEBLO, COLORADO.

MOLD FOR ORNAMENTAL ARTIFICIAL STONE.

No. 835,175.　　　　Specification of Letters Patent.　　　　Patented Nov. 6, 1906.

Application filed September 30, 1905. Serial No. 280,781.

*To all whom it may concern:*

Be it known that I, ASAHEL L. BEMIS, a citizen of the United States, residing at Pueblo, in the county of Pueblo and State of Colorado, have invented certain new and useful Improvements in Molds for Ornamental Artificial Stone; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to imitation-stone composition, molds for the same, and plate-glass facings, in which the composition of broken glass, plaster-of-paris, sand, hydraulic cement, and water which when dried produces a stone equal in solidity and beauty to granite or marble.

My invention greatly facilitates the art of producing an apparent polish to portions of the stone by the use of my panels of plate-glass, which are held in the composition so as to appear to be a polished surface of the stone. Inscriptions for monuments may be beautifully marked out by etching or painting on the face of the glass panels next the composition.

The objects of my invention are, first, to facilitate the forming of stone uniformly; second, to cheapen the cost of stones that are to be used as polished stones for the purpose of ornamentation, and, third, to produce an ornamental stone for monuments and building purposes in localities where granite or marble is scarce or high in price. I attain these objects by the use of the materials described in conjunction with a suitable mold that is easily and quickly made in any desired form, a grave-monument and a mold for the same being illustrated in the accompanying drawings, in which—

Figure 1:
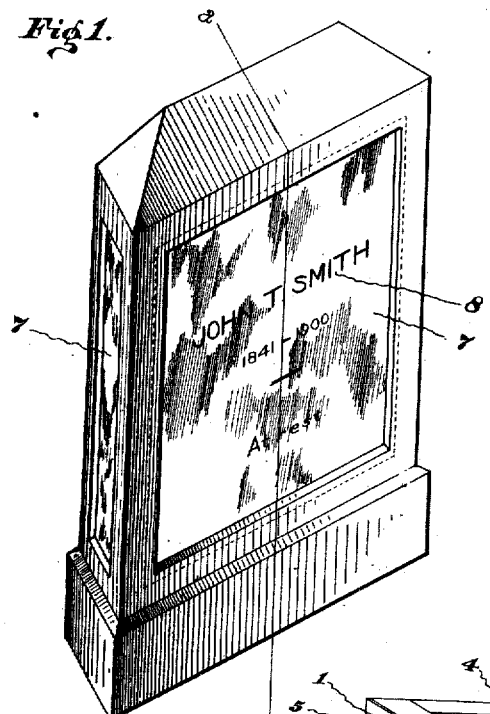
Figure 2:
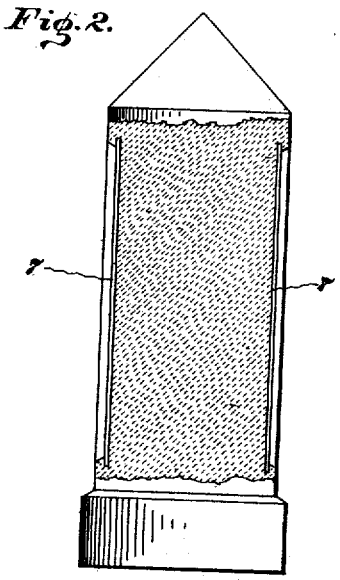
Figure 4:
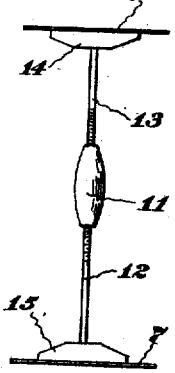
Figure 3:
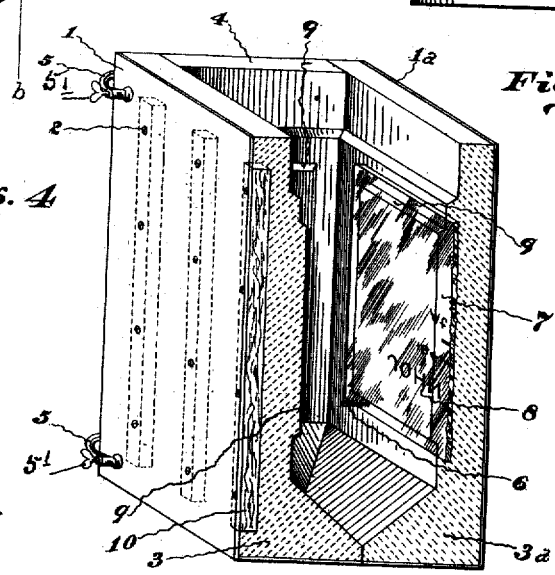

Figure 1 is a perspective view of a grave-monument. Fig. 2 is a vertical sectional view of Fig. 1 on the line *a b*. Fig. 3 is a cross-section in perspective through the center of my mold suitable for forming the grave-monument in Fig. 1, and Fig. 4 is a plan view of my turnbuckle-brace used for holding the plate-glass panels in place.

My invention is described as follows: To produce my stone, take broken glass and screen it through a four-mesh screen and screen the product through a twelve-mesh screen, retaining that part which does not pass through the twelve-mesh screen and mix it with an equal part of plaster-of-paris. Take one part of this mixture, two parts of clean sharp sand, and one part of hydraulic cement and mix the whole thoroughly together while dry. Then add water until the mixture has the consistency of thin mortar or until it will run easily. For a mixture to produce a marble effect use the same mixture as above, except use the finer glass that has passed through the twelve-mesh screen, handling the mixture in the same manner as the mixture for producing granite.

To further employ the composition above described, I use a mold of my own construction, as shown in Fig. 3. The sides of said mold are constructed of thin sheet-metal plates 1 and 1$^a$, to the inner faces of which are fastened by suitable screws 2 wooden strips 10 for the purpose of furnishing a hold for the cement 3 and 3$^a$ to the plates, the cement being used as a part of the mold. Said cement is applied wet and of proper consistency to stand when applied and to be formed in such shape that the mold when completed will form a stone or monument of any desired shape. The ends 4 of the mold are built of the same material and in the same manner and the cement applied the same as in the sides of the mold. When the said cement has sufficiently dried, the two ends 4 are placed between the sides 1 and 1$^a$ at the edges thereof, and the parts are held securely together by clamps 5. These clamps work on the outside of the mold, their ends formed into bowed necks, and turn over and impinge against the outer faces of said sides, said bowed necks being provided with tightening thumb-screws 5'. When the mold is thus finished and ready for use, the said compound is poured into the mold and allowed to set until the stone so molded will stand. Then the said clamps 5 are removed, and the sides and ends of the mold are removed, leaving the finished stone ready for use.

To produce apparently polished surfaces, I use plate-glass panels. Said plate-glass panels are held in place in the mold by being set on pins 6, (see Fig. 3,) in which case I set the glass panels against the inner face or faces of the protruding part 9 of the cement lining 3 and 3$^a$. To hold said plate-glass panels 7 firmly while the mixture is being applied, I use a turnbuckle-brace, (see Fig. 4,) which consists of a turnbuckle 11, right and left threads turning into said buckle and flat-faced heads 14 and 15, secured one to each of the free ends of said rods. This turnbuckle-brace is placed between said plate-glass panels 7 and said turnbuckle 11 turned until said panels are held tightly against the protruding part 9 of the cement 3 and 3ª. The described composition is then poured into said mold until it is filled up to the said turnbuckle-brace, which is placed near the center of the plate-glass panels it holds. Then said turnbuckle and braces are removed, said panels being held sufficiently in place by the weight of the mixture. Additional compound is then poured in until the mold is full. The compound is then troweled off level with the upper end of the mold and is allowed to stand until sufficiently set to be handled. After the mold is removed from the stone the holes made by the pins 6 are filled with the compound and smoothed off. The said glass panels by the above-described operation are thus embedded on the stone, so that they cannot be removed without defacing.

I am aware that imitation-stone compositions and molds for forming various stones have been made, and I therefore do not claim such a combination broadly; but What I do claim as my invention, and desire to secure by Letters Patent, is—

1. A mold for the manufacture of ornamented artificial stones, consisting of containing sides formed of hardened plastic material upon supporting-backings, one or more of such backings being supplied with supporting or attaching strips, whereby the backing and the hardened plastic material are firmly secured together, substantially as described.

2. A mold for the manufacture of ornamented artificial sides and ends; clamps for holding the sides against the outer edges of the ends, and a removable brace, adapted to extend from one side to the opposite of the mold and to bear against and temporarily retain in place any panel or other ornament for the exterior of the molded object, substantially as described.

In testimony whereof I affix my signature in presence of two witnesses.

ASAHEL L. BEMIS.

Witnesses:
PAUL WILSON,
G. L. KNIGHT.